US 12,099,329 B2

(12) United States Patent
Gioia et al.

(10) Patent No.: US 12,099,329 B2
(45) Date of Patent: Sep. 24, 2024

(54) METHOD FOR PROCESSING A HOLOGRAM, AND ASSOCIATED DEVICE, HOLOGRAPHIC DISPLAY SYSTEM AND COMPUTER PROGRAM

(71) Applicant: FONDATION B-COM, Cesson Sevigne (FR)

(72) Inventors: Patrick Gioia, Servon-sur-Vilaine (FR); Antonin Gilles, Rennes (FR)

(73) Assignee: FONDATION B-COM, Cesson Sevigne (FR)

( * ) Notice: Subject to any disclaimer, the term of this patent is extended or adjusted under 35 U.S.C. 154(b) by 865 days.

(21) Appl. No.: 17/050,214

(22) PCT Filed: Mar. 20, 2019

(86) PCT No.: PCT/EP2019/056994
§ 371 (c)(1),
(2) Date: Oct. 23, 2020

(87) PCT Pub. No.: WO2019/206528
PCT Pub. Date: Oct. 31, 2019

(65) Prior Publication Data
US 2021/0240135 A1 Aug. 5, 2021

(30) Foreign Application Priority Data
Apr. 23, 2018 (FR) ...................................... 1853536

(51) Int. Cl.
*G03H 1/22* (2006.01)
*G03H 1/08* (2006.01)
*G06F 3/01* (2006.01)

(52) U.S. Cl.
CPC ......... *G03H 1/2294* (2013.01); *G03H 1/0808* (2013.01); *G06F 3/011* (2013.01)

(58) Field of Classification Search
CPC ..... G03H 1/2294; G03H 1/0808; G06F 3/011
(Continued)

(56) References Cited

U.S. PATENT DOCUMENTS

2005/0286101 A1\* 12/2005 Garner ..................... G03H 1/02
359/9
2010/0067075 A1\* 3/2010 Schwerdtner ............ G03H 1/08
359/9
(Continued)

OTHER PUBLICATIONS

"Lens-System Diffraction Integral Written in Terms of Matrix Optics", Collins et al., Journal of the Optical Society of America, vol. 60, No. 9, pp. 1168-1177) (Year: 1970).\*
(Continued)

*Primary Examiner* — Audrey Y Chang
(74) *Attorney, Agent, or Firm* — NIXON & VANDERHYE

(57) ABSTRACT

Disclosed is a method for processing an input hologram HE associated with an input plane, to obtain an output hologram displayable on a holographic screen placed in a plane called the output plane of a display system, viewable from a viewing plane of the system. The method includes: receiving the input hologram and a position of the input plane; obtaining a first transfer matrix representative of a propagation between the input plane and the viewing plane; obtaining a second transfer matrix representative of a propagation between the viewing plane and the output plane; calculating an overall matrix of transfer of a light field emitted by the input hologram, between the input plane and the output plane, by taking the product of the two matrices; and converting the input hologram into the output hologram by applying an operator dependent of the input hologram and on the screen.

15 Claims, 8 Drawing Sheets

Figure 1:
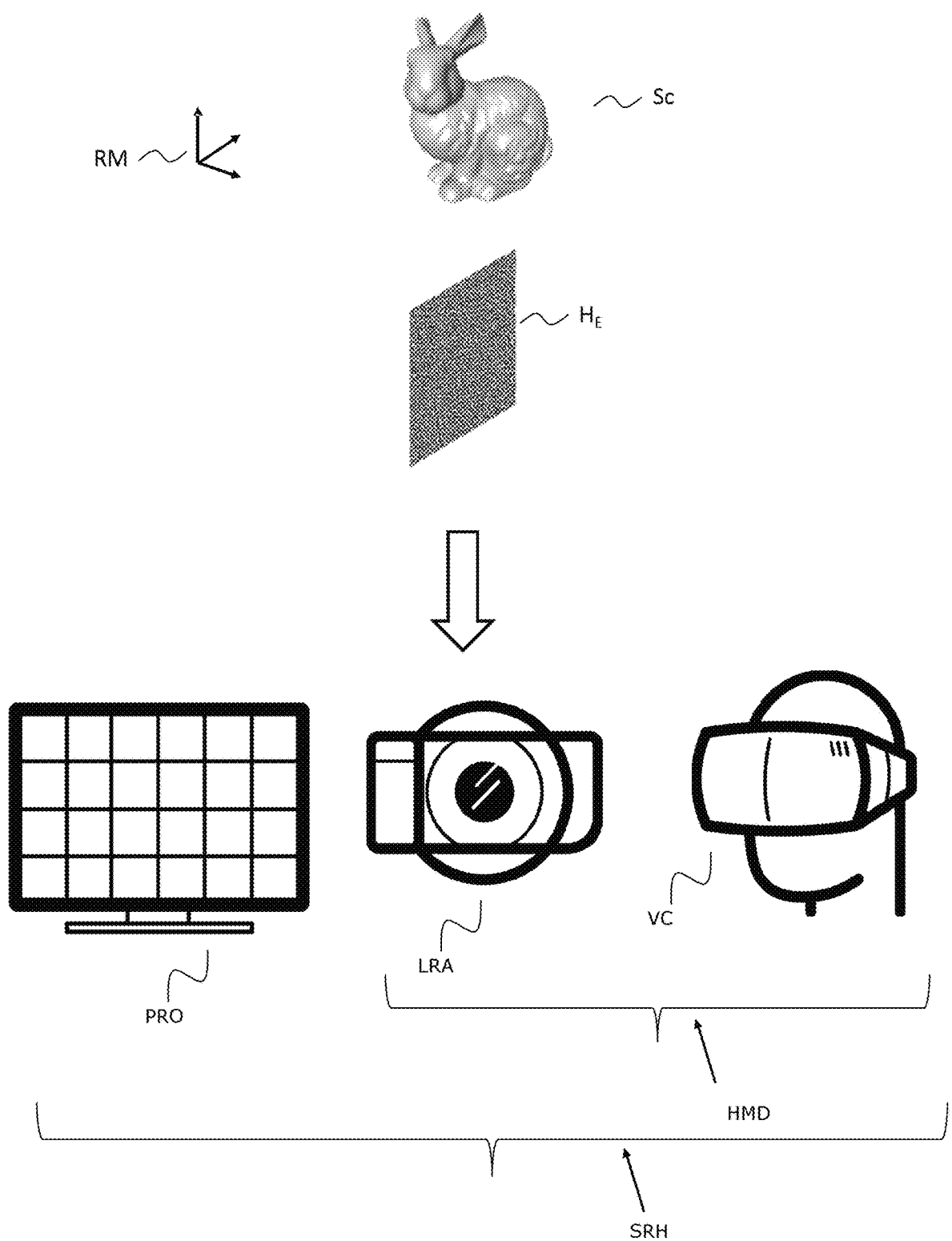

(58) Field of Classification Search
USPC ........................................................ 359/9, 13
See application file for complete search history.

(56) References Cited

U.S. PATENT DOCUMENTS

| | | |
|---|---|---|
| 2010/0165429 A1 | 7/2010 | Buckley et al. |
| 2017/0085860 A1* | 3/2017 | Zhang ........................ G06T 7/80 |
| 2017/0185037 A1* | 6/2017 | Lee ........................ G03H 1/2294 |

OTHER PUBLICATIONS

J.J. Healy, et al., "Chapter 12: Analyzing Digital Holographic Systems with the LCT", Linear Canonical Transforms, Springer Series in Optical Sciences 198, first edition, 2016, pp. 347-365.

Tsubasa Ichikawa, et al., "CGH calculation with the ray tracing method for the Fourier transform optical system", Optics Express, vol. 21, No. 26, Dec. 17, 2013, 13 pages.

D.P. Kelly, et al., "Quantifying the 2.5D imaging performance of digital holographic systems", Journal of the European Optical Society: Rapid Publications 6, published Jun. 14, 2011, 14 pages.

International Search Report for PCT/EP2019/056994 dated Apr. 29, 2019, 8 pages.

Written Opinion of the ISA for PCT/EP2019/056994 dated Apr. 29, 2019, 8 pages.

\* cited by examiner

METHOD FOR PROCESSING A HOLOGRAM, AND ASSOCIATED DEVICE, HOLOGRAPHIC DISPLAY SYSTEM AND COMPUTER PROGRAM

This application is the U.S. national phase of International Application No. PCT/EP2019/056994 filed Mar. 20, 2019 which designated the U.S. and claims priority to FR Patent Application No. 1853536 filed Apr. 23, 2018, the entire contents of each of which are hereby incorporated by reference.

FIELD OF THE INVENTION

The field of the invention is that of digital holography, in particular the adaptation of a pre-existing hologram in order to make it displayable by a particular holographic reproduction system.

The invention may in particular, but not exclusively, be applied to the uses of virtual or augmented reality to reproduce the input hologram on a head-mounted display and possibly to superimpose it to a virtual scene that the user perceives through a transparent screen of his head-mounted display HMD.

PRESENTATION OF THE PRIOR ART

Nowadays, with the appearance of hologram libraries, digital holograms of varied resolutions and sizes can be obtained.

The person skilled in the art knows how to reproduce a pre-existing hologram on a holographic screen device provided that the hologram in question has the same resolution and the same size as the screen.

On the other hand, if the input hologram has resolution and size that are different from those of the holographic screen of the reproduction system or if the reproduction system that integrates the holographic screen comprises optical elements arranged between the plane of the holographic screen and a plane in which the hologram is viewed, then the hologram could appear very deformed or unusable.

Moreover, it is known from J. J. Healy et al., "Linear Canonical Transforms—Theory and Applications", edited by New York: Springer-Verlag, first edition, in 2016, pp. 347-366, a method of optical generation of a hologram on a charge-coupled sensor or CCD (for "Charge-Coupled Device"), in which a reference beam and an object beam, resulting from the reflection of the reference beam on the objects of the scene, are conventionally made to interfere with each other, on a surface consisted of a set of pixels.

The propagation of the object beam up to the CCD sensor is made through an arrangement of several optical elements (lenses, beam splitters, etc.).

This method seeks to optimize the parameters of the optical system by simulating the propagation of the light field through the optical elements that constitute it. That way, the parameters of the optical system are adjusted to obtain a light field having the desired characteristics.

It is based on a so-called "Linear Canonical Transform" (LCT) theory, described for example in the above-mentioned Healy et al. document, pages 39-80. This theory makes the link between two types of mathematical transformations, which are:

The ray transfer matrices, linear transformations expressing the ray direction change induced by the passing through an optical element. They integrate the parameters of the optical element. If each ray is represented by spatial and angular parameters, the transfer matrix of an optical element is the linear transform of these parameters that, to each input ray, associates the output ray. The transfer matrices of the conventional optical elements are known from the person skilled in the art. It may be mentioned, for example:

A free propagation, in vacuum or in the air, over a distance d:

$$Mv = \begin{pmatrix} I & \lambda dI \\ 0 & I \end{pmatrix},$$

A thin lens of focal length f:

$$Ml = \begin{pmatrix} I & 0 \\ -I/\lambda f & I \end{pmatrix},$$

where I represents the identity matrix $$\begin{pmatrix} 1 & 0 \\ 0 & 1 \end{pmatrix}.$$

The integral operators:
To each transfer matrix $$M = \begin{pmatrix} A & B \\ C & D \end{pmatrix}$$

is associated an integral operator T that, to a function $f$ representing a field, associates a function $f'$ such that:

$$f' = T(f) \tag{1}$$

$f'$ being defined by $$f'(X') = \det(iB)^{-1/2} \int f(X) e^{i\pi P(x,x')} dx, \tag{2}$$

with $$P(X,X') = B^{-1}AX + DB^{-1}X' - 2X^t B^{-1} X', \tag{3}$$

X and X' being two-component real vectors and A, B, C and D being 2×2 matrices.

According to this theory, the obtained operator performs the transformation operated on the light field by the optical element in question.

Hence, a cascade of optical elements can be represented by an overall ray transfer matrix, product of the ray transfer matrices of the optical elements successively passed through. The resulting overall matrix that is obtained can be interpreted as a transform of the space/frequency distribution of the light field.

According to this theory, the overall transfer matrix can be associated with a single integral operator, which describes the propagation of a light field through the totality of the optical system.

DRAWBACKS OF THE PRIOR ART

The prior proposes no solution to adapt an existing hologram to a holographic reproduction system.

There hence exists a need for a solution for adapting a pre-existing digital hologram to a particular holographic reproduction system, which is simple, which does not deform the hologram viewed by the user with respect to the existing hologram, and which is usable in wearable reproduction systems of the HMD type.

OBJECTS OF THE INVENTION

The invention helps in improving the situation.

The invention has in particular for object to compensate for these drawbacks of the prior art.

More precisely, an object of the invention is to propose a solution for adapting a pre-existing hologram to a particular display device, which is simple and which does not deform the hologram.

Another object of the invention is to propose a solution that is able to be integrated in a reproduction system wearable by the user, such as a head-mounted display, and that adapts itself in real time to a displacement of the user.

DISCLOSURE OF THE INVENTION

These objects, as well as others that will appear hereinafter, are achieved by means of a method for processing at least one input hologram associated with at least one input plane in a World reference frame, in order to obtain an output hologram displayable on a holographic screen placed in a so-called output plane of a reproduction system and viewable by an observer from a viewing plane of said system, said system comprising at least one optical element arranged between the viewing plane (PV) and the output plane.

Such a method is particular in that it comprises the following steps:
  obtaining the input hologram and a pose of the associated input plane in the World reference frame;
  obtaining at least one first ray transfer matrix, called extrinsic matrix, representative of a propagation in free space between the input plane and the viewing plane of the reproduction system;
  obtaining at least one second ray transfer matrix, called intrinsic matrix, representative of a propagation between the viewing plane and the output plane of the reproduction system through at least one said optical element;
  calculating at least one overall ray transfer matrix of a light field emitted by the input hologram between the input plane and the output plane of the reproduction system, by a product of at least two of said matrices; and
  transforming a light field of the input hologram into a light field of the output hologram by application of at least one linear integral operator determined from the at least one calculated overall matrix, as a function of input sizes and input resolutions of the input hologram and of output sizes and output resolutions of the holographic screen.

The invention hence proposes a perfectly new and inventive approach that makes it possible to adapt in a simple way a pre-existing hologram to a particular reproduction system, in such a manner that the output hologram displayed on the holographic screen of this system reproduces to an observer the same view of the reconstructed 3D scene as that of the input hologram in the input plane.

The invention uses the properties of the "Linear Canonical Transform" theory to explain rather simply, in the form of 4×4 ray transfer matrices, the distortion undergone by a light field emitted by any input hologram during its reverse propagation from the input plane to the viewing plane, on the one hand, and from the viewing plane to the output plane, on the other hand, through the succession of optical elements constituting the holographic reproduction system. The compensation for this distortion is expressed as one or several linear transformation integral operator(s) applicable to any input hologram.

The linear integral operator(s) take into account the resolutions and sizes of the input hologram to transform it into an output hologram whose resolutions and sizes correspond to those of the holographic screen. That way, the invention makes it possible to make any input hologram displayable by the holographic reproduction system.

Due to its simplicity, the invention is well adapted to real-time applications.

According to one aspect of the invention, when the holographic reproduction system comprises a module for the non-linear processing of the light field of the input hologram, the step of obtaining at least one intrinsic matrix comprises obtaining a first matrix representative of a propagation of the light field through at least one linear optical element located upstream from the non-linear processing module and obtaining a second intrinsic matrix representative of a propagation of the processed light field through at least one linear optical element located downstream from the filtering module, the step of calculating at least one overall matrix comprises calculating a first overall matrix by a product of the at least one extrinsic matrix and the first intrinsic matrix and a second overall matrix from the second intrinsic matrix, the step of transforming the light field of the input hologram comprises the successive application of a first linear integral operator from the first overall matrix, an operator of the non-linear processing and a second linear integral operator from the second overall matrix ($M_A$).

An advantage lies in the taking into account of a light field non-linear processing integrated to the reproduction system, as for example a filtering, while proposing a simple compensation, by a minimum number of linear integral operators, for the linear distortions undergone by the input hologram.

According to another aspect of the invention, the method comprises a step of obtaining a pose of the observer in the World reference frame, a step of evaluating a visibility of the at least one input hologram by the observer, and the steps of obtaining ray transfer matrices and transforming the input hologram are implemented when the at least one input hologram is evaluated as visible by the observer.

An advantage is that the output hologram is recalculated only when necessary.

According to still another aspect of the invention, after detection of a change of the observer's pose in the World reference frame, the method updates at least one extrinsic matrix and the at least one overall transformation matrix as a function of said change, transforms the input hologram by application of at least one linear integral operator determined from the at least one updated overall ray transfer matrix.

An advantage is that only the extrinsic matrix is impacted by the displacement of the reproduction system and that the updating of the overall transformation operator is uncomplicated and operable in real time. The invention is hence well adapted to a mobile reproduction system, for example worn by a moving user.

According to still another aspect of the invention, when the output plane of the reproduction system is not parallel to the input plane of the input hologram, the method comprises a step of obtaining a matrix of rotation of the light field between the input plane and a corrected plane, parallel to the viewing plane, a step of determining a non-linear operator of transformation of the light field by composition of a Fourier transform, a rotation frequency operator from said rotation matrix and an inverse Fourier transform, and the transformation step further comprises the application of said non-linear operator previously to said at least one linear integral operator.

An advantage is to allow the user to position/turn as he chooses with respect to the reference plane of the input hologram.

According to still another aspect of the invention, the step of calculating a first overall matrix implements the product of the inverse Fourier transform, the extrinsic matrix and the first intrinsic matrix.

An advantage is to group all the linear operations consecutively applied to the light field into a single pre-calculated operator.

According to still another aspect of the invention, the light field of the input hologram comprising a plurality of samples function of the input sizes and input resolutions, the step of transforming the light field of the input hologram by at least one linear operator comprises the application to said samples of a discrete Fourier transform and the transformed light field is sampled as a function of the output resolutions and output sizes of the output hologram.

A first advantage is the adaptation of the input light field to the sizes and resolution of the output plane, which guarantees the observer to see the totality of the scene reconstructed by the input hologram. A second advantage is that, by grouping the transformations to be applied to the input hologram into a minimum number of linear integral operators, the number of Fourier transforms to be calculated and hence the overall complexity of the processing is hence reduced.

According to still another aspect of the invention, when a plurality of input holograms is associated with a plurality of input planes forming the faces of a geometric solid, the method comprises a step of selecting input planes corresponding to faces visible from the output plane, the steps of obtaining at least one extrinsic matrix, the step of calculating at least one overall ray transfer matrix, and the transformation step transforms the input holograms of the selected input planes by application of at least one linear integral operator determined from the at least one calculated overall matrix, and sums the transformed fields to obtain the output hologram.

An advantage is that, when several input holograms of a same 3D scene are placed on faces of a cube or another geometric solid, the invention makes it possible to transform only the input holograms corresponding to faces visible from the observer's position and direction.

According to still another aspect of the invention, the at least one obtained extrinsic matrix and the at least one obtained intrinsic matrix are stored into a memory.

An advantage is that they can be at least partly reused for a new input hologram or for a new pose of the observer. If the input hologram has different sizes and resolutions, the operator(s) will have to be updated.

Correspondingly, the invention also relates to a device for implementing the method for processing at least one input hologram according to the invention as defined hereinabove. This device can of course include the different features relating to the method according to the invention. Hence, the features and advantages of this device are the same as those of the processing method, and will not be further detailed.

According to a particular embodiment of the invention, such a device is comprised in a holographic reproduction system comprising a module for obtaining an input hologram associated with an input plane in a World reference frame, an output plane in which is placed a holographic screen intended to reproduce a hologram, called output hologram, a viewing plane in which the output hologram is intended to be viewed by a user, and at least one optical element, placed between the viewing plane and the output plane.

It is, for example, a projector, that is fixed and that does not take into account the observer's position.

According to an aspect of the invention, the holographic reproduction system is a head-mounted device, intended to be worn on the head of a user, the viewing plane is placed in front of the user's eyes, the output plane is placed out of a vision cone of the user, and the holographic reproduction system comprises at least the following optical elements:
- a module for receiving an input hologram having input sizes and input resolutions;
- a module for obtaining a pose of the observer in a World reference frame;
- a holographic screen in the output plane, having output sizes and output resolutions;
- an optical filtering system, of the 4F type, comprising a non-linear filtering module and two thin lenses;
- a field lens intended to enlarge a viewing field of the light field perceived by the observer on the viewing plane; and
- a beam splitter intended to redirect the light field of the hologram in the direction of the viewing plane.

The invention also relates to a computer program including instructions for implementing the steps of a method for processing at least one input hologram as described hereinabove, when this program is executed by a processor.

This program may use any programming language. It may be loaded from a communication network and/or recorded on a computer-readable medium.

The invention finally relates to a recording medium, readable by a processor, integrated or not to the processing device according to the invention, potentially removable, memorizing a computer program implementing the processing method according to the invention, as described hereinabove.

LIST OF FIGURES

Figure 2A:
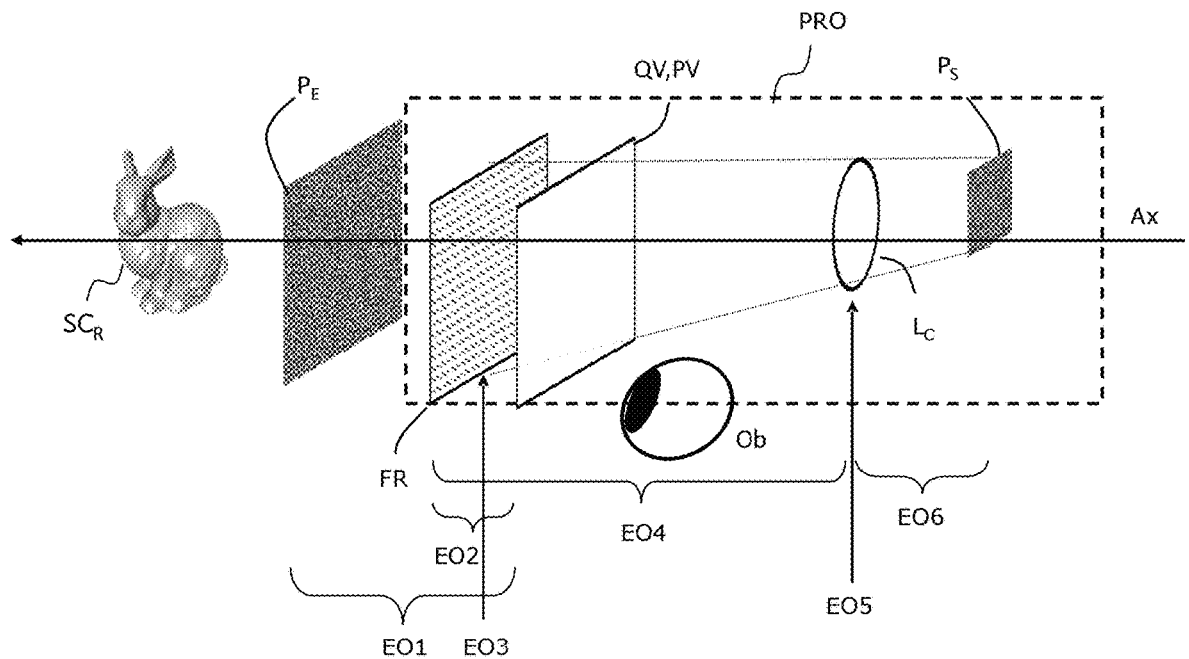
Figure 2B:
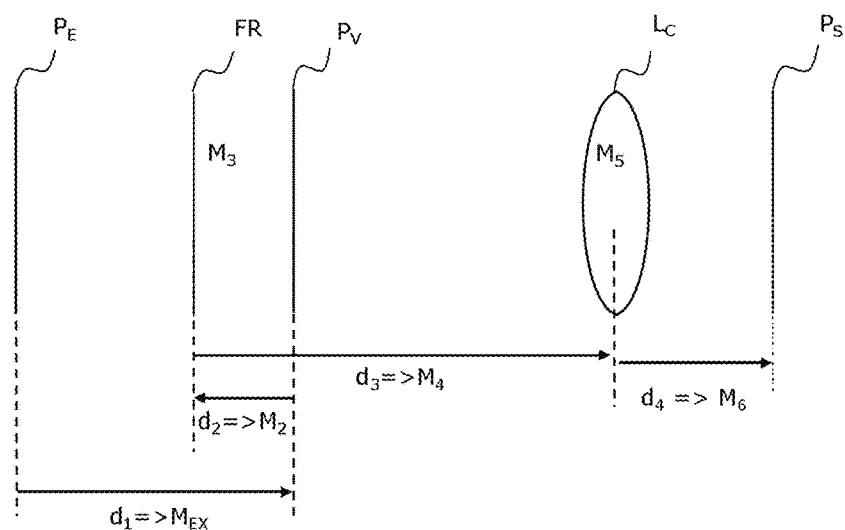
Figure 3:
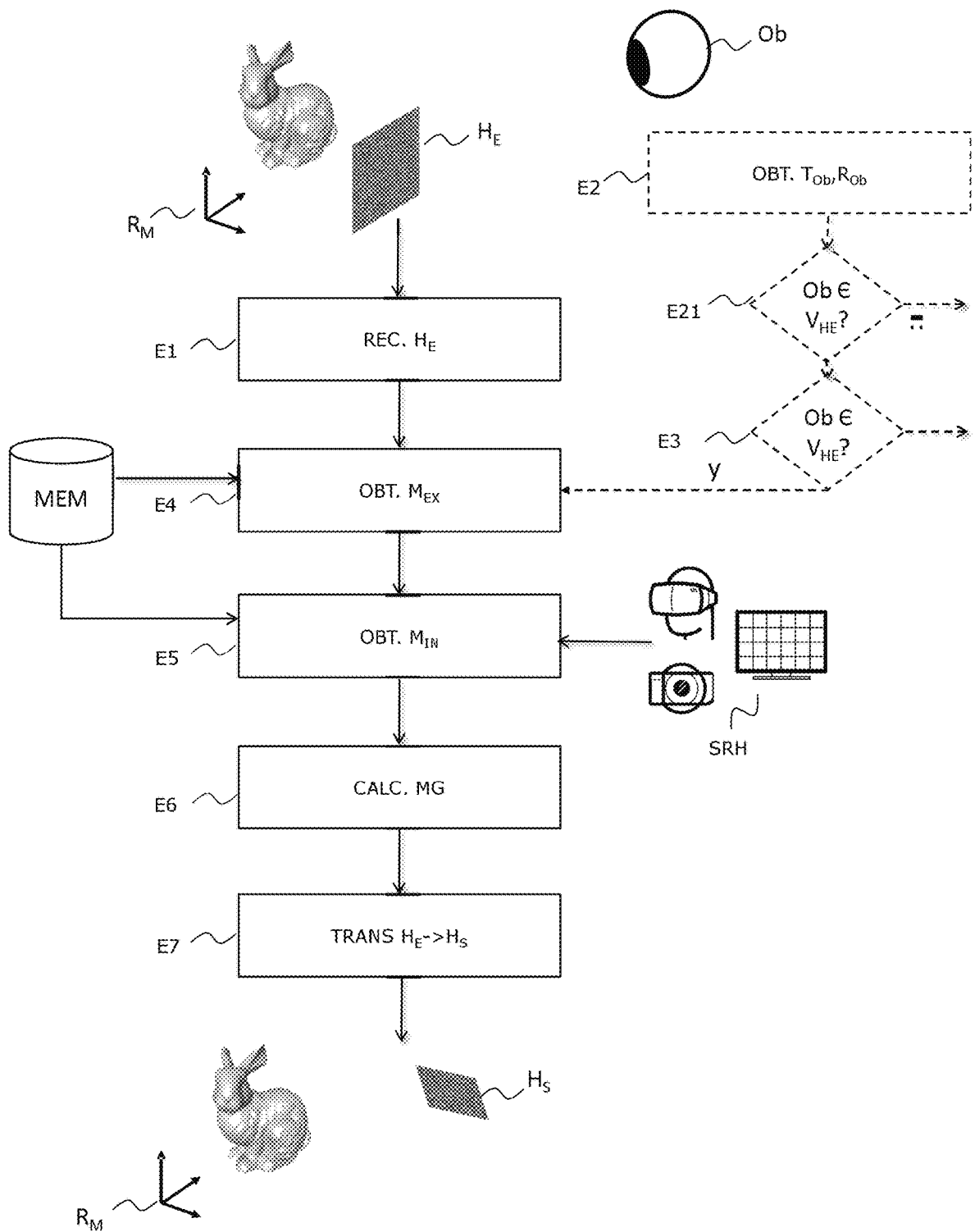
Figure 4A:
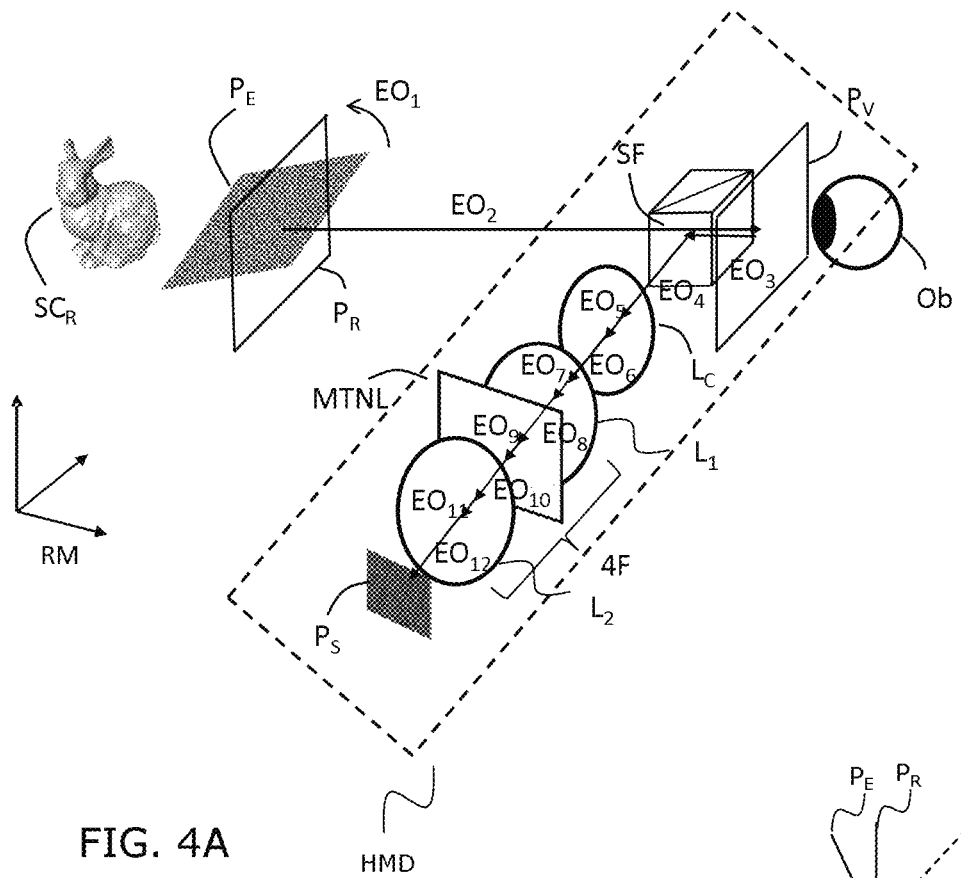
Figure 4B:
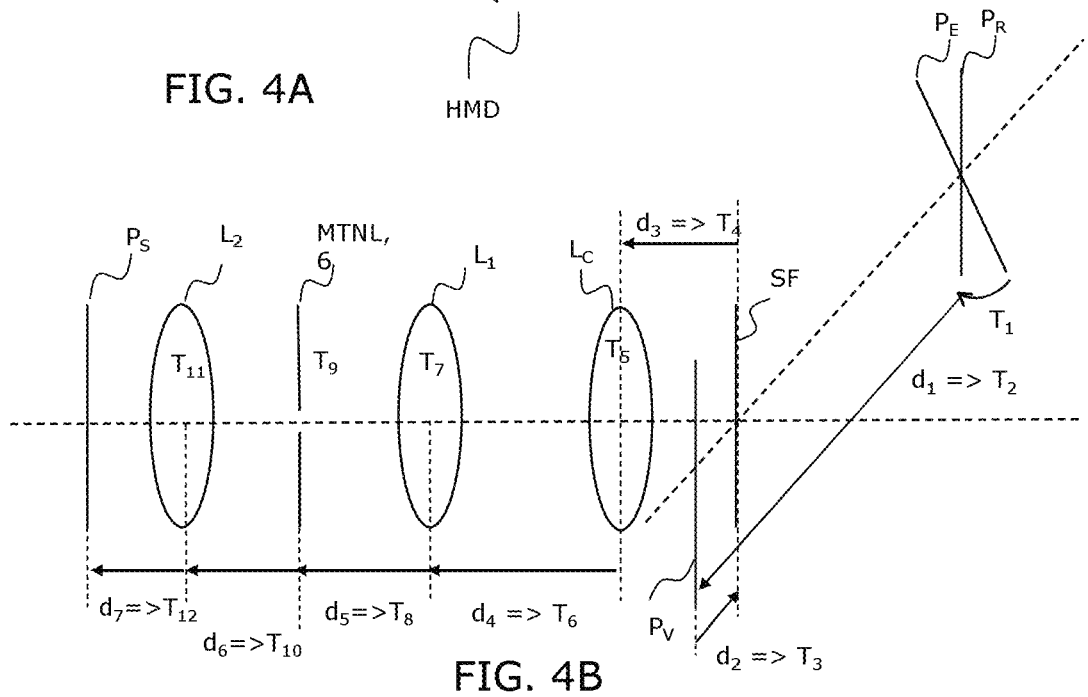
Figure 5A:
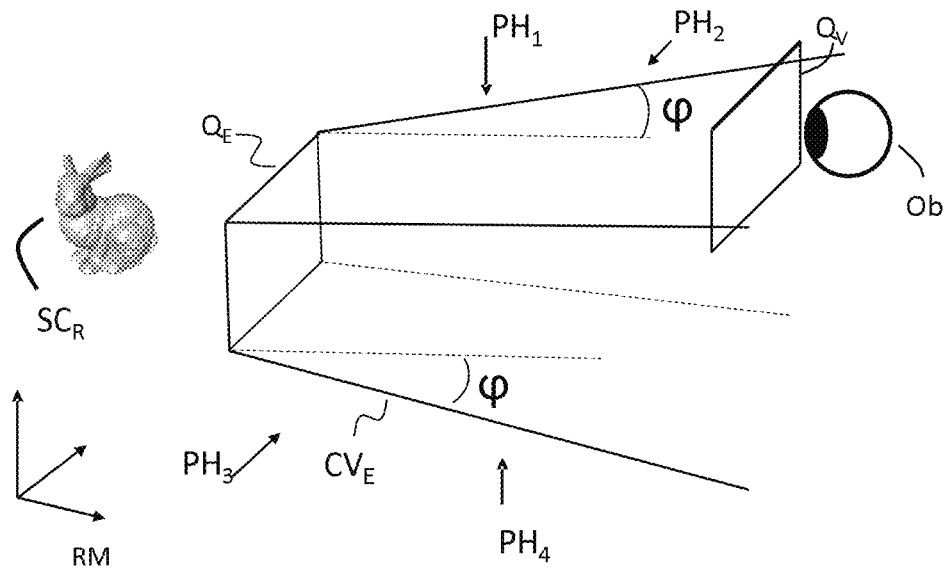
Figure 5B:
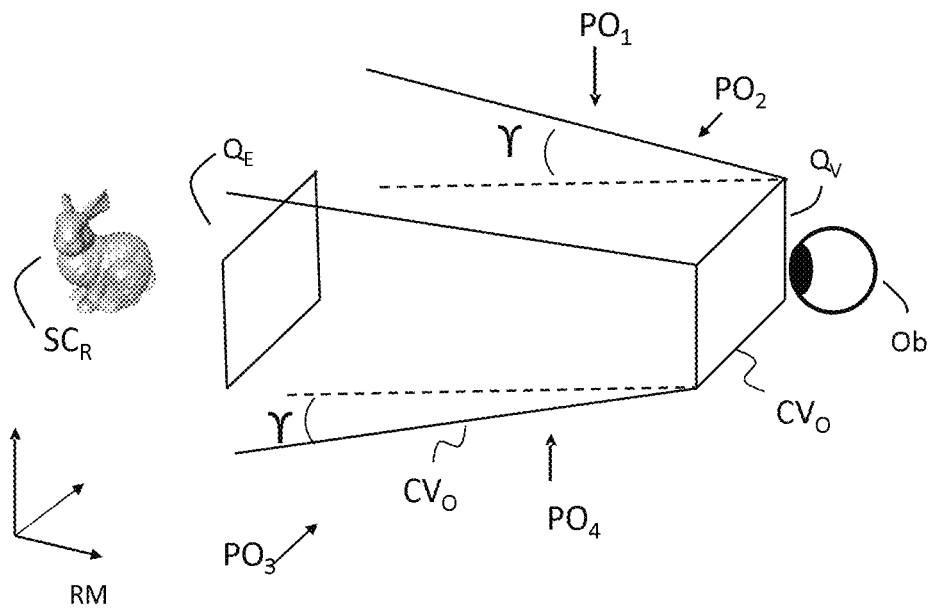
Figure 6:
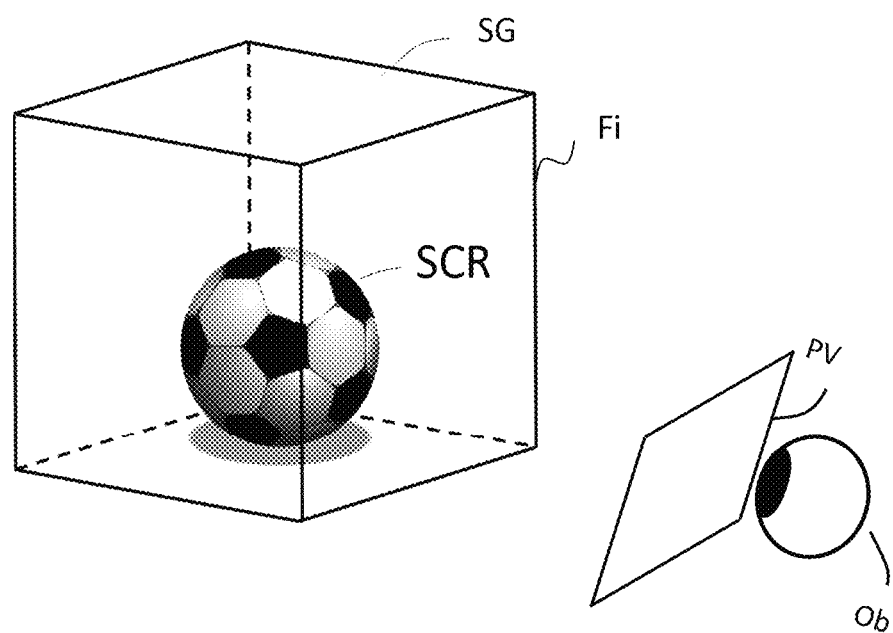
Figure 7:
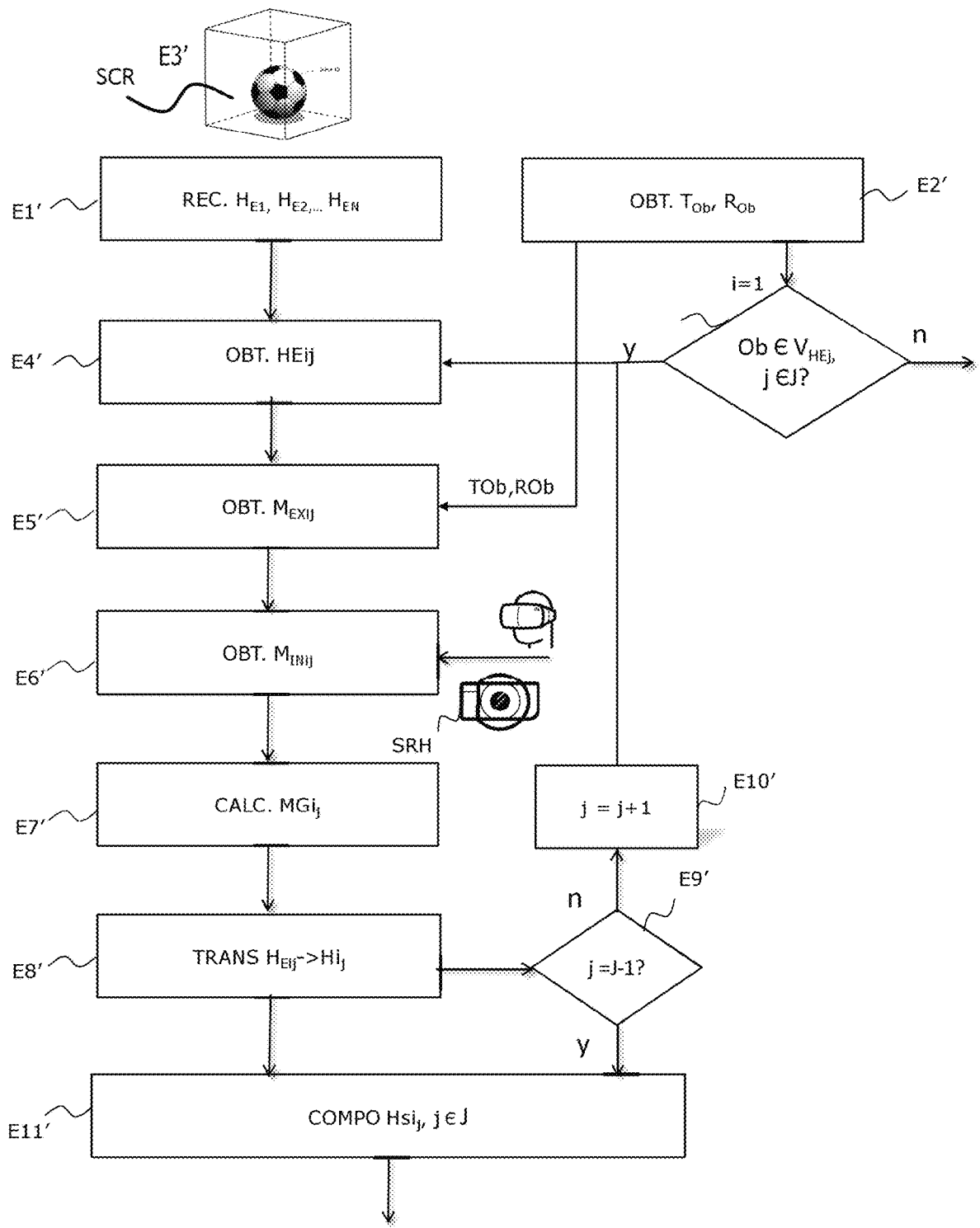
Figure 8:
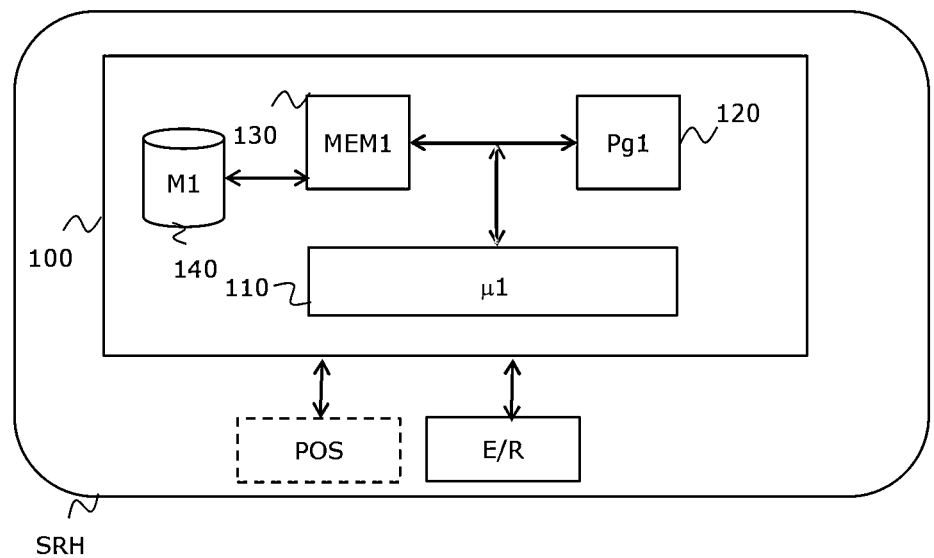
Figure 9:
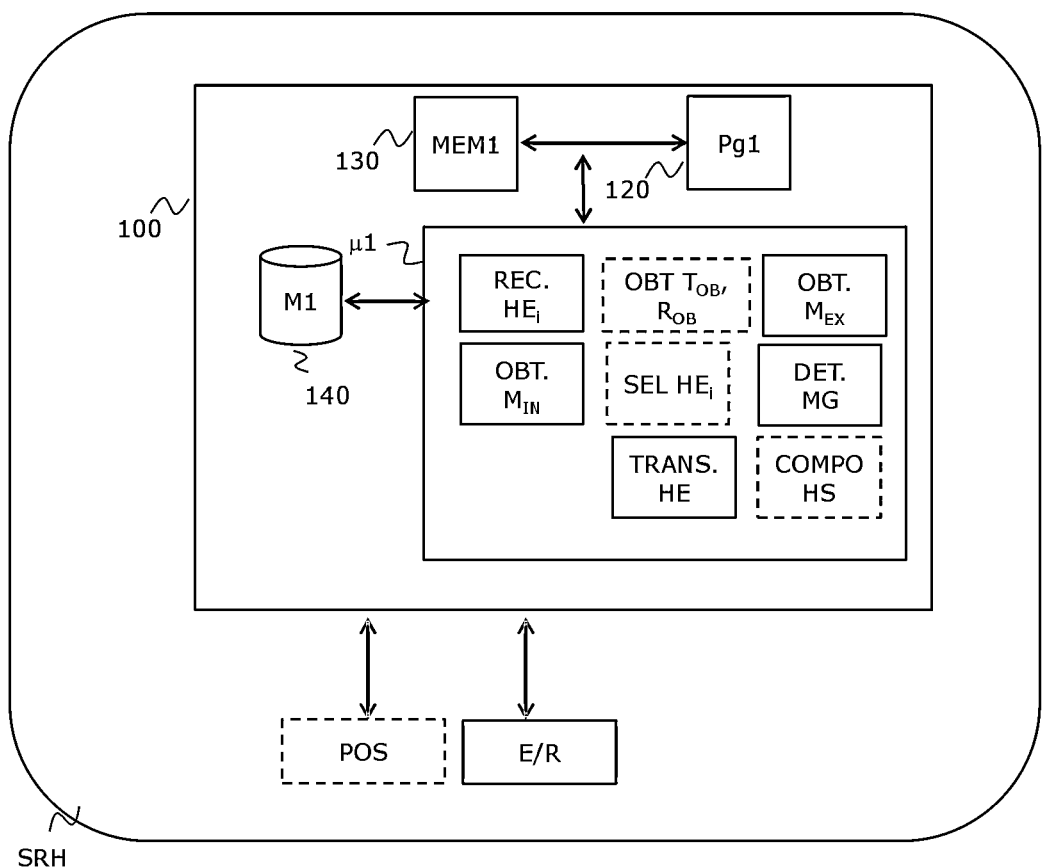

Other advantages and features of the invention will appear more clearly upon reading of the following description of a particular embodiment of the invention, given by way of simple illustrative and non-limitative example, and of the appended drawings, among which:

FIG. 1 schematically illustrates the processing of an input hologram made by the invention to adapt it to a holographic reproduction system;

FIG. 2A schematically describes the arrangement of a first example of holographic reproduction system implementing the invention;

FIG. 2B describes in further detail the arrangement of the optical elements constituting this first holographic reproduction system;

FIG. 3 schematically shows the steps of processing an input hologram according to a first embodiment of the invention;

FIG. 4A schematically describes the arrangement of a second example of holographic reproduction system implementing the invention;

FIG. 4B describes in further detail the arrangement of the optical elements constituting this second holographic reproduction system;

FIG. 5A schematically illustrates the visibility cone of an input hologram;

FIG. 5B schematically illustrates the vision cone of an observer through a holographic reproduction system;

FIG. 6 illustrates an example of reproduction of a 3D scene based on a plurality of holograms displayed on the faces of a cube, according to a third exemplary embodiment of the invention;

FIG. 7 schematically describes the method for processing a plurality of holograms associated with the faces of a geometric solid according to this third embodiment of the invention;

FIG. 8 schematically illustrates a first example of hardware structure of an input hologram processing device according to the invention; and FIG. 9 schematically illustrates a second example of hardware structure of an input hologram processing device according to the invention.

DESCRIPTION OF A PARTICULAR EMBODIMENT OF THE INVENTION

In relation with FIG. 1, a 3D scene is considered, from which an input hologram $H_E$ has been generated. It is associated with an input plane $P_E$, or plane of the input hologram, in which it is intended to be displayed, with given sizes and resolution. In other words, the input data forming this hologram $H_E$ correspond to a plurality of discrete values or samples of a complex light field in a quadrilateral $Q_E$ of this plane, this plurality being defined by the sizes and resolution of the input hologram.

This input plane $P_E$ is associated with a pose, i.e. known position and direction in a reference frame, called the World reference frame RM. This pose is generally received with the input hologram, when the latter comes for example from a hologram library, and it allows reproducing the hologram in good conditions, i.e. viewing a reconstructed scene at the good scale. Of course, another pose of the input plane $P_E$ can be chosen by a particular application or use, for example virtual or augmented reality or also videoconference, which uses this input hologram.

For example, the pose of the input plane can be modified as a function of that of a holographic reproduction system (SRH) in such a manner that the face of the corresponding quadrilateral $Q_E$ at the output of the light field is visible by the latter.

Three examples of holographic reproduction systems SRH have been represented, which are a projector PRO, and body-worn display systems or HMD (for "Head-Mounted Display"), such as Augmented Reality Glasses LRA or a Virtual Reality Helmet VC.

The general principle of the invention is based on the rapid adaptation of an input hologram $H_E$ for the reproduction thereof by such a holographic system comprising at least one optical element arranged between the hologram display device, also called holographic screen, of the Spatial Light Modulator or SLM type, and a virtual viewing plane $P_V$ of the latter. This adaptation is obtained by transforming the light field of the input hologram in the input plane into an output hologram H5 intended to be displayed by the SLM, by means of an overall linear operator, that compensates for the passing through of the holographic reproduction system optical elements arrangement by the light field.

Hereinafter, the image, formed by the eye of an observer Ob, of the light field that passes through a quadrilateral $Q_V$ of the viewing plane $P_V$ is called reconstructed scene $SC_R$. This light field is initially formed on the output plane $P_S$ of the SLM by the product of a plane monochromatic wave of wavelength $\lambda$ with the complex function representative of the hologram $H_S$, called output hologram, then transformed by the arrangement of optical elements through which it passes up to the viewing plane $P_V$. This complex function is recalculated by the processing method according to the invention so as to compensate for the transformation induced by the passing through the just-described optical element arrangement constituting the HMD. That way, the light field that passes through the viewing plane $P_V$ coincides with that of the input hologram that passes through the input plane.

In order to perform the rapid calculating of the output hologram $H_S$, the invention performs two propagations:
- a direct propagation of the original hologram from the input plane $H_E$ to the viewing plane $P_V$; then
- a so-called "reverse" propagation of the light field from the viewing plane $P_V$ to the output plane $P_S$.

Then, to model these two propagations, the invention relies on the above-mentioned "Linear Canonical Transform" (LCT) theory. According to this theory, it is searched to represent a continuous succession of linear optical transformations due to the passing through optical elements, by a ray transfer matrix that is then associated with a single light propagation operator.

In relation with FIGS. 2A and 2B, a first exemplary embodiment of the invention is considered, when the holographic reproduction system SRH is of the projector PRO type PRO. The input hologram $H_E$ is associated with a plane $P_E$, called input plane, and with a quadrilateral $Q_E$ in the plane $P_E$. This plane is positioned in the World reference frame RM, like the holographic reproduction system SHR.

The projector PRO is fixed and comprises the following elements, arranged along an axis Ax and parallel to the input plane:

- Means (not shown) for receiving the input hologram $H_E$. For example, the system SRH comprises wired or wireless means for the connection to a communication network. The input hologram $H_E$ is associated with an input plane $P_E$ whose pose is supposed to be fixed in the World reference frame RM. It is provided as a discretized form on a quadrilateral $Q_E$ of sizes $Sx_E$ and $Sy_E$ including $Nx_E \times NY_E$ pixels, inscribed in the input plane $P_E$. By way of example, the holograms available in publicly accessible data libraries are of the order of 8K×4K pixels for sizes $Sx_E$ and $Sy_E$ of the order of about one cm. The greatest holograms available may be close to 72K×36K pixels for sizes $Sx_E$ and $Sy_E$ of the order of about ten cm;
- A holographic screen of the SLM type placed in a so-called output plane $P_S$;
- A field lens $L_C$ of focal length f intended to enlarge the view angle of the light field emitted by the SLM, located at a distance $d_4$ from the plane $P_S$. Typically, f and $d_4$ are of the order of 5 cm;
- A reflective film FR placed at a distance $d_3$ from the field lens whose purpose is to reflect the image coming from the holographic projector, as would do a cinema screen. Typically, the distance $d_3$ is chosen equal to 3 metres;
- A virtual viewing plane $P_V$ placed at a distance $d_2$ in front of the reflective film. The distance $d_2$ corresponds to a minimum distance of the observer with respect to the reflective film. Typically, the distance $d_2$ is chosen equal to 50 centimetres. The distance between the viewing plane $P_V$ and the input plane $P_E$ is given by $d_1$, of the order of 50 centimetres.

In relation with FIG. 3, we will now describe the steps of a method for processing an input hologram $H_E$ according to this first embodiment of the invention. During a step $E_1$, an input hologram $H_E$ is received by the holographic reproduction system SRH.

At this stage, a distinction is made between the following two successive propagations:
- a first propagation, called "extrinsic direct propagation", in free space, of the light field from the input hologram $H_E$ to the viewing plane of the reproduction system SRH;
- a second propagation, called "intrinsic reverse propagation", of the light field through the arrangement of optical elements constituting the SRH up to the plane $P_S$ of the holographic screen SLM.

At E4, an extrinsic ray transfer matrix $M_{EX}$ relating to the first propagation is obtained. It is not specific to the input hologram $H_E$. It can hence have been calculated in a preliminary phase then stored into a local memory MEM. In the example of the projector PRO, it consists of a propagation in free space over a distance $d_1$ between the input plane $P_E$ and the viewing plane $P_V$ of the projector.

It is hence simply expressed as:

$$M_{EX} = \begin{pmatrix} I & \lambda d_1 I \\ 0 & I \end{pmatrix}$$

with I the identity matrix.

At E5, at least one intrinsic ray transfer matrix $M_{IN}$ relating to the intrinsic reverse propagation of the light field of the hologram $H_E$, inside the SRH, is obtained, as a product of the ray transfer matrices of the optical elements that constitute it:

$$M_{IN} = M_6 \cdot M_5 \cdot M_4 \cdot M_3 \cdot M_2,$$

with:

$$M_2 = \begin{pmatrix} I & \lambda d_2 I \\ 0 & I \end{pmatrix}$$

for the propagation in free space over a distance $d_2$ between the viewing plane $P_V$ and the reflective film FR;

$$M_3 = \begin{pmatrix} I & 0 \\ 0 & -I \end{pmatrix}$$

for the reflection of the rays by the reflective film FR;

$$M_4 = \begin{pmatrix} I & \lambda d_3 I \\ 0 & I \end{pmatrix}$$

for the propagation in free space over a distance $d_3$ between the reflective film FR and the field lens $L_C$;

$$M_5 = \begin{pmatrix} I & 0 \\ -I/\lambda f & I \end{pmatrix}$$

for the propagation or the light field of the hologram $H_E$ through the field lens $L_C$; and $$M_6 = \begin{pmatrix} I & \lambda d_4 I \\ 0 & I \end{pmatrix}$$

for the propagation in free space over a distance $d_4$ between the field lens $L_C$ and the output plane $P_S$. It will be noted that such a ray transfer matrix makes it possible to model a so-called linear propagation, in the sense that the expression of the rays at the output of the optical element is linear as a function of the expression of the input rays, these rays being expressed by a point in space, respectively input and output ones, and angles, respectively input and output ones.

In the case where the system SRH would comprise a non-linear processing module interposed between two linear optical elements, not only it would be required to model the effect of this non-linear processing on the light field by means of a general light field transformation operator, but it would also be necessary to determine a first ray transfer matrix to model the effect of the optical elements located upstream from the non-linear transfer module on the light field of the hologram, and a second ray transfer matrix to model that of the optical elements located downstream from the non-linear processing module. An example will be described in more details in relation with FIGS. 4A and 4B.

It is herein supposed that the holographic reproduction system PRO comprises no non-linear processing module. Hence, a single intrinsic ray transfer matrix $M_{IN}$ is obtained.

At E6, an overall ray transfer matrix $M_G$ of a light field emitted by the input hologram $H_E$ from the input plane $P_E$ to the output plane $P_S$ of the reproduction system SRH is calculated, by a product of the extrinsic ray transfer matrix $M_{EX}$ and the intrinsic ray matrix $M_{IN}$:

$$M_G = M_{EX} \cdot M_{IN}$$

At E7, the input hologram $H_E$ is transformed by application of an integral transformation operator T obtained from the calculated overall matrix $M_G$, in accordance with the above-described equations (1) to (3). This operator T performs the transformation of the light field of the input hologram $H_E$ through the arrangement of optical elements of the SRH up to the output plane $P_S$ of the holographic screen.

Hence, if the overall matrix $M_G$ is equal to $$\begin{pmatrix} A & B \\ C & D \end{pmatrix},$$

with A, B, C and D 2×2 matrices, the operator T is defined in theory as the operator that transforms the field $f$ of the input hologram $H_E$ into the field $f'$ of the output hologram $$f'(X') = T(f)(X') = \det(iB)^{-1/2} \int f(X) e^{i\pi P(X,X')} dx, \qquad (2)$$

with $$P(X,X') = B^{-1}AX + DB^{-1}X' - 2X^t B^{-1} X', \qquad (3)$$

and X, X' the vectors of spatial components of the light fields of the input plane $P_E$ and the output plane $P_S$, respectively.

In practice, the operator T is discretized by transforming the integrals of the equation (2) into discrete sums to take into account the resolution $Nx_E$, $Ny_E$ and the sizes $Sx_E$, $Sy_E$ of the input hologram $f$, and the resulting field $f'$ is sampled according to the resolution $N_{xS}$, $N_{yS}$ and the sizes $Sx_S$, $Sy_S$ of the output hologram $H_S$, as follows:

$$f'_{k,l} = \det(iB)^{-\frac{1}{2}} \sum_{i=1}^{NxE} \sum_{j=1}^{NyE} f_{i,j} e^{i\pi P(X_{i,j}, X'_{k,l})} \Delta_X \quad (4)$$

where k, l are the indices of the sample $f'_{k,l}$, which corresponds to the discretized version of the light field $f'$ transformed by the linear operator T;
with $$f_{i,j} = f(X_{i,j}) \quad (5)$$

$$f'_{k,l} = f'(X'_{k,l}) \quad (6)$$

$$X_{i,j} = \begin{pmatrix} i\Delta_x \\ j\Delta_y \end{pmatrix} \quad (7)$$

$$X'_{k,l} = \begin{pmatrix} k\Delta'_x \\ j\Delta'_y \end{pmatrix} \quad (8)$$

$$\Delta'_x = \begin{pmatrix} k\Delta'_x \\ j\Delta'_y \end{pmatrix} \quad (9)$$

and $$\Delta_X = \frac{S_x S_y}{NxE, NyE} \quad (10)$$

Advantageously, the function $f'_{k,l}$ is calculated according to a known method that consists in extracting therefrom a discrete Fourier transform:

$$f'_{k,l} = \det(iB)^{-\frac{1}{2}} e^{i\pi DB^{-1} X'_{k,l}} \Delta_X TFD_B(G)(X'_{k,l}) \quad (11)$$

$TFD_B$ denotes the discrete Fourier transform staggered by a factor $B^{-1}$, G being the following discrete function:

$$e^{i\pi B^{-1} AX_{i,j}} f_{i,j} \quad (12)$$

A number of samples $f'_{k,l}$ corresponding to the resolutions $Nx_s$, $Ny_s$ and sizes $Sx_s$, $Sy_s$ of the output holographic screen SLM is hence calculated.

The light field of the output hologram that is to be reproduced by the SLM for an observer Ob to visualize correctly the scene reconstructed by the input hologram $H_E$ in the viewing plane $P_V$ is hence obtained.

It is understood that the fact to group into a single linear operator all the transformations to be applied to the input light field makes it possible to limit the total number of Fourier transforms to be calculated and hence to reduce the complexity of the system.

In relation with FIGS. 4A and 4B, we will now describe a second exemplary embodiment of the processing method according to the invention, when the holographic reproduction system SRH is a device intended to be worn on the head of a user, such as a head-mounted display or augmented-reality glasses. It will be called hereinafter HMD.

In this example, the HMD comprises:
a module (not shown) for receiving an input hologram $H_E$, similar to the above-described one. The means for the connection to the communication network are herein preferentially of the wireless type;
a module (not shown) for obtaining a pose $T_{Ob}$, $R_{Ob}$ of the observer Ob in the reference frame RM. As already mentioned, this pose is generally expressed as 6 parameters representative of a translation $T_{Ob}$ and a rotation $R_{Ob}$ in the reference frame RM. It can be obtained with a position tracking device, of the IMU ("Inertial Measurement Unit") type, known from the person skilled in the art, placed on the HMD;
a display device of the holographic screen SLM type, placed in an output plane $P_S$. The SLM has the sizes $Sx_s$, $Sy_s$ and it is discretized into $Nx_s \times Ny_s$ pixels. The usual values of $Nxs$ and $Ny_s$ vary between 720 and 4096, for sizes $Sx_s$ and $Sy_s$ of the order of about one cm. It is generally placed on the side or on the top of the observer's head so as to be out of his viewing field;
a filtering system of the 4F type, know from the person skilled in the art, intended to suppress frequencies associated with directions of emission of undesirable diffraction orders. It comprises a non-linear processing module MTNL and two thin lenses $L_1$ and $L_2$;
a field lens $L_C$ intended to enlarge the light field emitted by the SLM; and
a beam splitter SF intended to redirect the light field of the hologram in the direction of a viewing plane $P_V$ behind which the eye of an observer Ob is positioned. Indeed, the SLM is placed on the side or on the top of the observer's head, whereas the viewing plane of the hologram is located in front of the observer's eyes, as a glass of a pair of glasses. The viewing plane $P_V$ and the output plane $P_S$ are hence not parallel to each other. That way, the possibility for the observer Ob to see his real environment by transparency in superimposition on a 3D scene $SC_R$ reconstructed by the hologram is preserved.

The HMD/observer unit being mobile in the World reference frame RM, the input plane $P_E$ and viewing plane $P_V$ are this time not necessarily parallel to each other.

In relation with FIG. 4B, the propagation path of the light field of the input hologram from the input plane $P_E$ to the output plane of the SLM is decomposed as follows:
a rotation $EO_1$ between the input plane $P_E$ and a corrected plane $P_R$ parallel to the viewing plane $P_V$;
a propagation $EO_2$ in free space from the corrected plane $P_R$ up to the viewing plane $P_V$, over a length $d_1$;
a propagation $EO_3$ in free space, over a length $d_2$ from the viewing plane $P_V$ up to the beam splitter SF. The passing through the beam splitter SF is omitted because it acts as a mirror;
a propagation $EO_4$ in free space, from the beam splitter SF up to the field lens $L_C$, over a length $d_3$;
a passing $EO_5$ through the field lens $L_C$;
a propagation $EO_6$ in free space between the field lens $L_C$ and the first lens $L_1$ of the filtering system 4F, over a distance $d_4$;
a passing $EO_7$ through the first lens $L_1$ of the filtering system 4F;
a propagation $EO_8$ in free space between the first lens $L_1$ of the filtering system 4F and the non-linear processing module MTNL, over a distance $d_5$;
a processing $EO_9$ of non-linear filtering MTNL;
a propagation $EO_{10}$ in free space between the non-linear processing module MTNL and the second lens $L_2$ of the system 4F, over a distance $d_6$;
a passing $EO_{11}$ through the second lens $L_2$ of the system 4F; and
a propagation $EO_{12}$ in free space between the second lens $L_2$ of the filtering system 4F and the output plane $P_S$ of the SLM, over a distance $d_7$.

Each of the optical elements or processing operations mentioned hereinabove is denoted $EO_1$, $EO_2$, $EO_3$, $EO_4$, $EO_5$, $EO_6$, $EO_7$, $EO_8$, $EO_9$, $EO_{10}$, $EO_{11}$ and $EO_{12}$, respectively, and the propagation operator representing the passing through the optical element $EO_i$, i.e. the operator that, with a light field arriving at the input of the optical element $EO_i$, associates the light field that exits therefrom, is denoted $T_i$. The propagation from the input hologram $H_E$ to the SLM on the output plane $H_S$ is hence represented by the operator:

$$T = T_{12} o T_{11} o T_{10} o T_9 o \ldots o T_1,$$

where o denotes the composition of the operators.

This chain of operators is composed of a so-called extrinsic part, relating to the direct propagation of the light field, in free space between the input plane $P_E$ and the viewing plane $P_V$, and of a so-called intrinsic part, relating to the reverse propagation of the light field, inside the augmented reality system SRH. The extrinsic part depends on the position and direction of the observer with respect to the input plane $P_E$ of the hologram $H_E$ and hence changes at each displacement of the observer Ob, whereas the intrinsic part is independent of the movements thereof and can be modelled once for all in a preliminary phase. The extrinsic part corresponds to the processing by the operators $T_1$ and $T_2$, the intrinsic part corresponds to the processing by the product of the operators $T_3$ to $T_{12}$.

In this example, two processing operations undergone by the light field on the path thereof between the input plane $P_E$ and the output plane $P_S$ cannot be represented by a ray transfer matrix.

They are:
1) the rotation $EO_1$ of the light field between the input plane $P_E$ and a corrected plane $P_R$, parallel to the viewing plane $P_V$ corresponding to the relative direction between the HMD/observer system and the plane $P_E$ of the input hologram;
2) the filtering of the light field by the non-linear processing module MTNL, which corresponds to the optical element $EO_9$.

It is understood that, in this second example, it is not possible to model the transformation of the light field by a single operator of the LCT type, due to the fact that these two non-linear processing operations segment the chain of propagation operators into several propagation operators, 3 of which are of the LCT type.

The steps of the method for processing a input hologram according to the invention will now be described in this particular exemplary embodiment.

At E1, a hologram $H_E$ is received.

At E2, a pose of the observer Ob in the World reference frame RM is obtained. It is used to evaluate, at E3, if the input hologram is visible by the observer Ob. It is herein considered that the observer is integral with the HMD system that he wears on his head. That way, the pose of the observer corresponds to the pose of the HMD system.

More precisely, in relation with FIGS. 5A and 5B, it is considered that the hologram is visible by the observer Ob if, on the one hand, the quadrilateral $Q_E$ of the input hologram $H_E$ is in his vision cone $CV_o$, and if, on the other hand, the observer Ob himself is in the emission or visibility cone $CV_E$ of the hologram $H_E$, i.e. inside an angular sector in which the hologram is capable of emitting a light signal.

In other words, the matter is to make a test of reciprocal visibility, which may, for example, be calculated as follows:

Four planes $PH_1$, $PH_2$, $PH_3$ and $PH_4$ inclined by an angle q with respect to the quadrilateral $Q_E$ of the plane $P_E$ and respectively intersecting the four edges of $Q_E$ are defined. The angle φ may be chosen as the maximum diffraction angle given by $φ = \arcsin(λ/(2Sx_E/Nx_E))$. It is, for example, of 4.5 degrees for a hologram of resolution 72K with a size $Sx_E$ of the order of 30 cm. Likewise, four planes $PO_1$, $PO_2$, $PO_3$ and $PO_4$ inclined by an angle Y with respect to the quadrilateral $Q_V$, γ being the maximum viewing angle of the holographic reproduction system HMD, are defined. For the existing HMDs, Y is of the order of 30 degrees. The visibility cone $CV_E$ is delimited by the quadrilateral $Q_E$ and the planes $PH_1$, $PH_2$, $PH_3$ and $PH_4$, and the vision cone $CV_o$ of the observer is delimited by the quadrilateral $Q_V$ and the planes $PO_1$, $PO_2$, $PO_3$ and $PO_4$. The plane of the hologram $P_E$ and the viewing plane $P_V$ are then decreed mutually visible if at least one of the vertices of the quadrilateral $Q_E$ is inside $CV_o$, and if one of the vertices of the quadrilateral $Q_V$ defining $P_V$ is inside $CV_E$. We call inner side of a cone plane the side that is located inside the cone. For that purpose, it is verified that at least one vertex in question is located on the inner side of all the planes defining the concerned cone.

If the visibility test is positive, then the method continues with step E4. Otherwise, it is stopped until a new pose of the observer Ob is received.

At E4, the ray transfer matrices $M_{12}$, $M_{11}$, $M_{10}$, $M_8$, $M_7$, $M_6$, $M_5$, $M_4$, $M_3$, $M_2$, $M_{f-1}$ and $M_f$, respectively associated with the above-listed optical elements $EO_{12}$ to $EO_{10}$ and $EO_8$ to $EO_2$ are obtained.

At E5, a first overall ray transfer matrix $M_A$ corresponding to the path of the light field between the output of the filtering module EP9 and the output plane $P_S$ is calculated:

$$M_A = M_{12} \cdot M_{11} \cdot M_{10}$$

with $$M_{12} = \begin{pmatrix} I & λd_7 I \\ 0 & I \end{pmatrix}$$

for the propagation or the light field in free space over a distance $d_7$. It is for example possible to choose $d_7 = 2$ cm;

$$M_{11} = \begin{pmatrix} I & 0 \\ -I/λf_2 & I \end{pmatrix}$$

for the propagation of the light field through the thin lens $L_2$ of focal length $f_2$. It is for example possible to place a lens of focal length $f_2 = 5$ cm;

$$M_{10} = \begin{pmatrix} I & λd_6 I \\ 0 & I \end{pmatrix}$$

for the propagation of the light field in free space over a distance $d_6$. It is for example possible to choose $d_6 = 5$ cm.

And at E6, a second overall ray transfer matrix $M_B$ corresponding to the path of the light field between the corrected input plane $P_R$ and the input of the non-linear filtering module $EO_9$:

$$M_B = M_8 M_7 M_6 M_5 M_4 M_3 M_2 M_{f-1}$$

with $$M_8 = \begin{pmatrix} I & \lambda d_5 I \\ 0 & I \end{pmatrix}$$

for the propagation of the light field in free space over a distance $d_5$. It is for example possible to choose $d_5$=5 cm;

$$M_7 = \begin{pmatrix} I & 0 \\ -I/\lambda f_1 & I \end{pmatrix}$$

for the propagation of the light field through the thin lens $L_1$ of focal length $f_1$. It is for example possible to place a lens of focal lens $f_1$=5 cm;

$$M_6 = \begin{pmatrix} I & \lambda d_4 I \\ 0 & I \end{pmatrix}$$

for the propagation of the light field in free space over a distance $d_4$. It is for example possible to choose $d_4$=1 cm;

$$M_5 = \begin{pmatrix} I & 0 \\ -I/\lambda f_C & I \end{pmatrix}$$

for the propagation of the light field through the thin lens $L_C$ of focal length $f_C$. It is for example possible to place a lens of focal lens $f_C$=2 cm;

$$M_4 = \begin{pmatrix} I & \lambda d_3 I \\ 0 & I \end{pmatrix}$$

for the propagation of the light field in free space over a distance $d_3$. It is for example possible to choose $d_3$=1 cm;

$$M_3 = \begin{pmatrix} I & \lambda d_2 I \\ 0 & I \end{pmatrix}$$

for the propagation of the light field in free space over a distance $d_2$. It is for example possible to choose $d_2$=1 cm;

$$M_2 = \begin{pmatrix} I & \lambda d_1 I \\ 0 & I \end{pmatrix}$$

for the propagation of the light field in free space over a distance $d_1$. $d_1$ is of the order of about ten centimetres; $M_f^{-1}$ denotes an inverse Fourier transform.

$M_A$ is intrinsic and hence independent of the observer's displacements.

$M_B$ is partly extrinsic and intrinsic and depends on the observer's displacements, due to the matrix $M_2$.

It must be recalculated at each displacement of the observer Ob.

A non-linear operator $T_1$ for the transformation of the light field by the optical element $EO_1$ is considered. It consists of a rotation of the direction of the input plane $P_E$ towards the direction of the viewing plane $P_V$. The operator $T_1$ can hence be decomposed as follows:

$$T_1 = U o T_f,$$

where:

$T_f$ denotes the 2D Fourier transform. This is a linear operator;

U is the operator that, to a function f, associates foH, where H is the function that, to two spatial frequencies u and v, associates the two first components of the following product:

$$R \cdot \begin{pmatrix} u \\ v \\ \sqrt{\lambda^{-2} - u^2 - v^2} \end{pmatrix},$$

where R is a rotation matrix such that its application to the plane $P_E$ corrects the latter for it to be parallel to the viewing plane $P_V$ according to a method known by the person skilled in the art.

An operator LCT $T_A$ corresponding to the matrix $M_A$ and an operator LCT $T_B$ corresponding to the matrix $M_B$ are also considered, in accordance with the matching established by the equations (1) to (3).

We have $T_A = T_{12} o T_{11} o T_{10}$ and $T_B = T_8 o \ldots T_2 o T_{f^{-1}}$.

It is noted that the inverse Fourier transform $T_{f^{-1}}$ can be herein integrated to the operator $T_B$, because it is a linear operation.

An overall operator T for transforming the light field is deduced by means of the following expression:

$$T = T_A o T_9 o T_B o U o T_f.$$

For example, the filtering $T_9$ can be defined as the operator that, to a function f, associates f·H (product of functions), where H is the function that, to a couple (u, v) of real numbers, associates 1 if v>0 and 0 otherwise.

For example, it is a directional filtering blocking the rays directed upward, u and v representing the spatial frequency variables of the light signal. As a variant, a filter of bassband type could also be used.

At E7, the output hologram $H_S$ to be displayed on the screen SLM of the output plane so that the observer Ob can see, in the viewing plane $P_V$ of his HMD, the 3D scene $SC_R$ as reconstructed by the input hologram in the input plane, is now calculated.

For that purpose, the samples of the light field of the input hologram are transformed by successive applications to them of the operators $T_A$, $T_9$, $T_B$, U and $T_f$. As regards the linear operators, the successive transformations are made, as in the first exemplary embodiment, from the overall matrices $M_A$ and $M_B$, by application to the plurality of samples of the input light field of a discrete Fourier transform according to the above-described equation (11). The transformed light field is resampled to obtain the number of samples f·k, corresponding to the output resolutions $Nx_s$, $Ny_s$ and output sizes $Nx_s$, $Ny_s$ of the output hologram $H_S$.

In a variant embodiment of the invention, we consider now the case in which the observer Ob wearing the system HMD moves in the World reference frame RM. It is supposed that the system HMD is equipped with a module for obtaining the position/direction of the observer wearing the HMD in the World reference frame, which allows it to obtain a regular updating of this position/direction and to detect a displacement of the observer Ob with respect to the plane of the input hologram $P_E$. The existing HMDs allow for example an updating of this position/direction with a temporal frequency of the order of a few milliseconds. It is supposed that the just-described method according to the invention has been implemented at the instant to, then that a displacement of the observer Ob has been detected at an instant $t_1$ with respect to an instant $t_0$.

This detection triggers the updating of the operator U of rotation of the input plane $P_E$ with respect to the viewing plane $P_V$, of the matrix $M_2$ corresponding to the propagation in free space over a distance $d_1(t_1)$, and hence of the overall matrix $M_B$.

A new operator $T_B$ is calculated from the updated version of the overall matrix $M_B(t_1)$ at the instant $t_1$.

The aggregation of the operators by multiplication of the ray transfer matrices reduces the number of Fourier transforms to be calculated, which contributes to reduce the overall calculation time of the transformed light field. Indeed, as explained hereinabove, the application of each operator $T_i$ to the complex light field of the input hologram $H_E$ is performed by calculating a discrete Fourier transform. Thanks to the invention, the fact to translate the transformations induced by the passing through a plurality of optical elements by means of a limited number of overall operators, reduces proportionally the number of Fourier transforms to be applied, and hence the complexity of the processing method.

In relation with FIGS. 6 and 7, a third exemplary embodiment of the invention will now be described. In this third exemplary embodiment, several input holograms $H_{Ei}$, with i an integer comprised between 1 and N, are received, which are associated with the face planes of a geometric solid, such as for example a rectangular parallelepiped. In other words, there are as many reconstructed scenes as solid faces, which makes it possible to offer the observer a view of the scene from a wider range of points of view.

It is understood that this third embodiment is particular suited to a reproduction system of the HMD type, according to which the observer can move about the plane $P_E$ of the input hologram, and hence view certain faces of the geometric solid as a function his position/direction in the World Coordinate System RM.

In the example of FIG. 6, the geometric solid considered is a cube and the holographic reproduction system receives 6 holograms $H_{Ei}$, with i an integer comprised between 1 and I=6, the hologram $H_{Ei}$ being associated with one of the six faces Fi of the cube. In relation with FIG. 7, the method for processing this plurality of input holograms $\{H_{Ei}\}$ according to this second embodiment of the invention will now be described.

During a step E1', the plurality of holograms $\{H_{Ei}\}$ is received.

At E2', a pose of the observer Ob is obtained. At E3', at least one face Fi, with j comprised between 1 and N, of the cube of which the observer is liable to view the associated hologram $H_{Ej}$ is selected. In other words, it searched if there exist at least one face $Fi_j$ for which the field of the associated hologram $H_E i_j$ is viewable by the observer Ob. Advantageously, the above-described visibility test is performed for each of the faces Fi.

Two cases are contemplated:
A single visible face $Fi_j$ is selected and a single corresponding hologram $H_E i_j$ will be recalculated by the method according to the invention. This face will be for example the closest to the observer or that which passes the best the above-described visibility test;
Several visible faces $Fi_1, Fi_2 \ldots Fi_j$ are selected, with i an integer comprised between 1 and I, and the corresponding holograms are recalculated in order to compose an output hologram from the recalculated holograms. The contributions of each field are then summed into a total output hologram $H_S$.

In the first case, it is supposed that the face $Fi_0$ has been selected and then the method for processing the selected hologram $H_E i_0$ is then executed as described in relation with FIG. 2, which corresponds to steps E4' to E8' of FIG. 7.

In the second case, steps E4' to E8' are repeated for each of the selected input holograms $H_E i_j$, as long as all the selected faces have not been processed (E9', E10'). Once all the output holograms $H_S i_j$ calculated, an output hologram $H_S$ is composed from the J holograms $H_S i_j$ at E11'.

With the invention, it becomes possible for an observer wearing a system HMD to turn about the scene reconstructed by the plurality of holograms associated with the faces of the geometric solid.

It will be noted that the just-described invention can be implemented by means of software and/or hardware components. From this perspective, the terms "module" and "entity", used in this document, can correspond either to a software component, or to a hardware component, or also to a set of hardware and/or software components, adapted to implement the function(s) described for the concerned module or entity.

In relation with FIGS. 8 and 9, we will now present the simplified structure of a processing device 100 adapted to implement the method for processing an input hologram according to any one of the particular embodiments of the invention that have just been described in relation with FIGS. 2 to 7.

The processing device is adapted to process at least one input hologram and to produce an output hologram.

The processing device 100 is in particular configured to:
receive at least one input hologram and one associated pose in the World Coordinate System;
obtain at least one first matrix, called extrinsic geometric matrix (Me), representative of a propagation in free space between the reference plane and the output plane of the reproduction system, said matrix being function of the reference position and the output position;
obtain at least one second matrix, called intrinsic geometric matrix (Mi), representative of a propagation between the output plane and the input plane of the reproduction system through at least one said optical element;
calculate at least one overall matrix $M_G$ for geometric transformation of a light field emitted by the input hologram between the reference plane and the input plane of the reproduction system, by a product of at least two of said matrices;
transform the input hologram into the output hologram by application of at least one linear integral operator determined from the at least one calculated matrix, as a function of an input resolution $Nx_E$, $Ny_E$ and of input sizes of the input hologram ($P_E$) and of output resolutions $Nx_S$, $Ny_S$ and of output sizes $Sx_S$, $Sy_S$ of the holographic screen.

According to a particular embodiment of the invention illustrated by FIG. 8, the processing device 100 has the conventional architecture of a computer and comprises in particular a processing unit 110, equipped with a processor $\mu_1$, and piloted by a computer program $Pg_1$ 120, stored in a memory 130 and implementing the method according to the invention.

At the initialization, the code instructions of the computer program $Pg_1$ 120 are for example loaded in a memory RAM before being executed by the processor of the processing unit 110. The processor of the processing unit 110 implements the steps of the above-described method, according to the instructions of the computer program 120.

According to another particular embodiment of the invention illustrated by FIG. 9, the processing method is implemented by functional modules. For that purpose, the processing device 100 comprises at least the following functional modules:
- a module REC. for receiving one or several input holograms $H_E$;
- a module OBT. $M_{EX}$ for obtaining at least one first, so-called extrinsic, ray transfer matrix, representative of a propagation in free space between the reference plane and the output plane of the reproduction system;
- a module OBT. $M_{IN}$ for obtaining at least one second, so-called intrinsic, ray transfer matrix, representative of a propagation between the output plane and the input plane of the reproduction system through at least one said optical element;
- a module CALC. $M_G$ for calculating at least one overall ray transfer matrix of a light field emitted by the input hologram between the reference plane and the input plane of the reproduction system, by a product of said matrices; and
- a module TRANS for transforming the light field of the input hologram $H_E$ by application of at least one linear integral operator determined from the at least one calculated matrix, as a function of an input resolution $Nx_E$, $Ny_E$ and input sizes of the input hologram ($P_E$) and of an output resolution $Nx_s$, $Ny_s$ and output sizes $Sx_s$, $Sy_s$ of the holographic screen.

Optionally, the device 100 comprises a module OBT. $T_{Ob}$, $R_{Ob}$ for obtaining a pose of the observer in the World reference frame and a unit SEL $H_j$ for selecting at least one input hologram, visible by the observer.

According to an embodiment of the invention, the device 100 comprises a module COMPO for composing several output holograms obtained by transformation of input holograms selected as visible by the observer into a single output hologram.

The device 100 further comprises a module M1 for storing the ray transfer matrices calculated by the invention, as well as operators determined from these matrices.

The units are piloted by the processor µ1 of the processing unit 110.

The processing unit 110 cooperates with the different above-described functional modules and the memory MEM1 in order to implement the steps of the processing method. The different above-described functional modules may be in hardware and/or software form. In software form, such a functional module may include a processor, a memory and program code instructions to implement the function corresponding to the module when the code instructions are executed by the processor. In hardware form, such a functional module may be implemented by any type of adapted coding circuits, such as for example and non-limitatively, microprocessors, digital signal processors (DSPS), application specific integrated circuits (ASICs), field programmable gate arrays (FPGAs), a logical unit wiring.

Advantageously, such a device 100 may be integrated to a holographic reproduction system SRH. The device 100 is then arranged to cooperate at least with the following module of the system SRH:
- a data transmission/reception module E/R, through which the input hologram(s) $H_E$ are received via a telecommunication network, for example a wired network or a wireless network; and
- as the case may be, a module POS for tracking the position of the observer in the World reference frame RM.

It is obvious that the above-mentioned embodiments have been given for purely informative and non-limiting purposes, and that many modifications can be easily made by the person skilled in the art without thereby departing from the framework of the invention.

The invention claimed is:

1. A method for processing at least one pre-existing input hologram generated from a tridimensional scene, said input hologram having input sizes and input resolutions and being formed of a plurality of discrete values of a light field in a quadrilateral of an input plane, said input plane being positioned in a reference frame, in order to obtain an output hologram to be displayed on a holographic screen placed in an output plane of a holographic reproduction system having output sizes and output resolutions respectively different from the input sizes and the input resolutions, and viewable by an observer from a viewing plane of said system to form a reconstructed tridimensional scene, said system comprising at least one optical element arranged between the viewing plane and the output plane, wherein the method comprises the following steps:
   - receiving the input hologram and a position and a direction of said input plane in the reference frame;
   - obtaining at least one first ray transfer matrix, called extrinsic matrix, depending on a position and a direction of the observer in the reference frame, said extrinsic matrix being representative of a propagation in free space between the input plane and the viewing plane of the reproduction system;
   - obtaining at least one second ray transfer matrix, called intrinsic matrix, representative of a propagation between the viewing plane and the output plane of the reproduction system through said at least one optical element;
   - calculating at least one overall ray transfer matrix of a light field emitted by the input hologram between the input plane and the output plane of the reproduction system, by a product of at least two of said extrinsic and intrinsic matrices;
   - transforming the light field of the input hologram into a light field of the output hologram by application of at least one linear canonical transform operator determined from the at least one calculated overall ray transfer matrix, as a function of the input sizes and the input resolutions of the input hologram and of the output sizes and the output resolutions of the holographic screen; and
   - displaying the output hologram in the output plane so as to reproduce to the observer from the viewing plane, a same view of the reconstructed tridimensional scene as a view of the input hologram in the input plane, the light field of the output hologram that passes through the viewing plane thereby coinciding with the light field of the input hologram that passes through the input plane.

2. The method according to claim 1, wherein, when the holographic reproduction system comprises at least an optical filtering element configured for filtering the light field of the input hologram, the step of obtaining at least one intrinsic matrix comprises obtaining a first intrinsic matrix representative of a propagation of the light field through at least one optical element located upstream from the optical filtering element, and obtaining a second intrinsic matrix representative of a propagation of a light field through at least one other optical element located downstream from the optical filtering element, the step of calculating at least one overall ray transfer matrix comprises calculating a first overall matrix by a product of the at least one extrinsic matrix and the first intrinsic matrix and a second overall matrix from the second intrinsic matrix, the step of transforming the light field of the input hologram comprises the successive application of a first linear canonical transform operator determined from the first overall matrix, a filtering operator which describes the filtering of the light field through the optical filtering element and a second linear integral operator determined from the second overall matrix.

3. The method for processing at least one input hologram according to claim 2, further comprising:
a step of obtaining the position and the direction of the observer in the reference frame, and
a step of evaluating a visibility of at least one input hologram by the observer,
wherein the steps of obtaining a first ray transfer matrix, obtaining a second ray transfer matrix and transforming the input hologram are implemented when the at least one input hologram is evaluated as visible by the observer.

4. The method for processing at least one input hologram according to claim 3, further comprising:
after detection of a change of the observer's position and direction in the reference frame, updating at least one extrinsic matrix and the at least one overall ray transfer matrix as a function of said change to get at least one updated overall ray transfer matrix, and
transforming the input hologram by application of at least one updated linear canonical transform operator determined from the at least one updated overall ray transfer matrix.

5. The processing method according to claim 3, wherein, when the output plane of the reproduction system is not parallel to the input plane of the input hologram, the method further comprises:
obtaining a rotation matrix representing rotation of the light field between the input plane and a further plane, parallel to the viewing plane, and
determining a rotation operator which describes the rotation of the light field by composition of operators which comprises of a Fourier transform operator, a rotation frequency operator determined from said rotation matrix and an inverse Fourier transform operator,
wherein the transforming step further comprises the application of said rotation operator prior to the application of said at least one linear canonical transform operator.

6. The processing method according to claim 5, wherein the step of calculating a first overall matrix implements the product of the inverse Fourier transform operator, the extrinsic matrix and the first intrinsic matrix.

7. A non-transitory recording medium, readable by a computer, on which is recorded a computer program comprising program code instructions that, when executed by the computer, perform the method according to claim 2.

8. The processing method according to claim 1, wherein the plurality of discrete values is defined by input sizes and input resolutions, and wherein the step of transforming the light field of the input hologram by application of at least one linear canonical transform operator comprises the application to said discrete values of a discrete Fourier transform operator and a sampling the light field of the output hologram into a plurality of discrete values as a function of the output resolutions and output sizes of the output hologram.

9. The method for processing at least one input hologram according to claim 1, wherein, when a plurality of input holograms, each input hologram in said plurality is formed of a plurality of discrete values of a light field in a quadrilateral of a respective input plane, and forms a face among faces of a geometric solid, the method further comprises:
selecting among the faces of the geometric solid, the faces corresponding to faces visible from the output plane, to get selected input planes,
wherein obtaining at least one extrinsic matrix, and calculating at least one overall ray transfer matrix are repeated for each of the selected input planes, and the transforming transforms the light fields of the input holograms corresponding to faces visible from the observer's position and direction which corresponds to selected input planes, into transformed light fields and sums the transformed fields to obtain the output hologram.

10. The processing method according to claim 1, wherein the at least one obtained extrinsic matrix and the at least one obtained intrinsic matrix are stored into a memory.

11. A non-transitory recording medium, readable by a computer, on which is recorded a computer program comprising program code instructions that, when executed by the computer, perform the method according to claim 1.

12. The method for processing at least one input hologram according to claim 1, wherein the method comprises a step of obtaining the position and the direction of the observer in the reference frame, a step of evaluating a visibility of at least one input hologram by the observer, and wherein, the steps of obtaining a first ray transfer matrix, obtaining a second ray transfer matrix and transforming the input hologram are implemented when the at least one input hologram is evaluated as visible by the observer.

13. A device for processing a preexisting input hologram generated from a tridimensional scene, the input hologram having input sizes and input resolutions and being formed of a plurality of discrete values of a light field in a quadrilateral of an input plane, said input plane being positioned in a reference frame, in order to obtain an output hologram to be displayed on a holographic screen placed in an output plane of a reproduction system having output sizes and output resolutions respectively different from the input sizes and the input resolutions, and viewable by an observer from a viewing plane of said system to form a reconstructed tridimensional scene, said system comprising at least one optical element placed between the viewing plane and the output plane, wherein the device comprises a processor configured to:
receive the input hologram and a position and direction of said input plane in the reference frame;
obtain at least one first ray transfer matrix, called extrinsic matrix, depending on a position and a direction of the observer in the reference frame, said extrinsic matrix is representative of a propagation in free space between the input plane and the viewing plane of said system;
obtain at least one second ray transfer matrix, called intrinsic matrix, representative of a propagation between the viewing plane and the output plane of the reproduction system through said at least one optical element;
calculate at least one overall ray transfer matrix of a light field emitted by the input hologram between the input plane and the output plane of the reproduction system, by a product of at least two of said extrinsic and intrinsic matrices;

transform a light field of the input hologram into a light field of the output hologram by application of at least one linear canonical transform operator determined from the at least one calculated overall ray transfer matrix, discretized as a function of the input sizes and the input resolutions of the input hologram and resampled as a function of the output sizes and the output resolutions of the holographic screen; and control the holographic screen placed at the output plane to display the output hologram, so as to reproduce to the observer from the viewing plane, a same view of the reconstructed tridimensional scene as a view of the input hologram in the input plane, the light field of the output hologram that passes through the viewing plane thereby coinciding with the light field of the input hologram that passes through the input plane.

14. A holographic reproduction system comprising a module for receiving an input hologram corresponding to a plurality of discrete value of a light field in a quadrilateral of an input plan, said input plane is positioned in a reference frame, an output plane in which is placed a holographic screen intended to display an output hologram, a viewing plane from which the output hologram is intended to be viewed by an observer, and at least one optical element, arranged between the viewing plane and the output plane, further comprising a device for processing the input hologram into the output hologram according to claim 13.

15. The holographic reproduction system according to claim 14, the holographic reproduction system being a head-mounted device type, configured to be worn on the head of the observer, wherein the viewing plane is placed in front of the observer's eyes, the output plane is placed out of a vision cone of the observer, the holographic reproduction system comprising:

a module configured to receive an input hologram having input sizes and input resolutions;

a module configured to obtain the position and the direction of the observer in the reference frame;

the holographic screen in the output plane, having said output sizes and said output resolutions;

an optical filtering system, in a 4F configuration, comprising an optical filtering element and two thin lenses;

a field lens configured to enlarge a viewing field of the light field perceived by the observer on the viewing plane; and a beam splitter configured to redirect the light field of the output hologram in the direction of the viewing plane.

* * * * *